US012748922B2

(12) United States Patent
Dai et al.

(10) Patent No.: US 12,748,922 B2
(45) Date of Patent: Sep. 29, 2026

(54) DERIVING HETEROGENOUS CONTEXT FOR EVALUATING GENERATED CODE

(71) Applicant: INTERNATIONAL BUSINESS MACHINES CORPORATION, Armonk, NY (US)

(72) Inventors: Ting Dai, Tampa, FL (US); Larisa Shwartz, Greenwich, CT (US); Yu Deng, Yorktown Heights, NY (US); Ruchi Mahindru, Elmsford, NY (US); Prateeti Mohapatra, Bangalore (IN); Rohan R Arora, Champaign, IL (US); Chandrasekhar Narayanaswami, Wilton, CT (US); Pooja Aggarwal, Bengaluru (IN); Tuan Minh Hoang Trong, Jackson Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 18/594,218

(22) Filed: Mar. 4, 2024

(65) Prior Publication Data

US 2025/0278569 A1 Sep. 4, 2025

(51) Int. Cl.
*G06F 40/30* (2020.01)

(52) U.S. Cl.
CPC .................................... *G06F 40/30* (2020.01)

(58) Field of Classification Search
None
See application file for complete search history.

(56) References Cited

U.S. PATENT DOCUMENTS 7,490,352 B2 2/2009 Kramer
7,672,831 B2 3/2010 Todhunter
(Continued)

FOREIGN PATENT DOCUMENTS

CN 111177312 A 5/2020
CN 111240687 A 6/2020
(Continued)

OTHER PUBLICATIONS

Ren, Shuo, et al. "Codebleu: a method for automatic evaluation of code synthesis." arXiv preprint arXiv:2009.10297 (2020).*
(Continued)

*Primary Examiner* — Paras D Shah
(74) *Attorney, Agent, or Firm* — Caleb D. Wilkes

(57) ABSTRACT

A method, computer system, and a computer program product for code evaluation are provided. Knowledge bases in first and/or second programming languages are searched to find code and associated natural language explanations that correspond to code generated by a machine learning model. Additionally and/or alternatively, the code generated by the machine learning model undergoes code-to-natural language translation by another machine learning model and text summarization via an additional machine learning model. Machine learning semantic comparison of (A) an original prompt submitted to the first machine learning model to generate the code and (B) a natural language explanation obtained via one or more of the above approaches is performed. The machine learning semantic comparison generates a first semantic correctness score which is presented.

20 Claims, 3 Drawing Sheets

(56) References Cited

U.S. PATENT DOCUMENTS

| | | | | |
|---|---|---|---|---|
| 8,301,633 | B2 | 10/2012 | Cheslow | |
| 11,507,352 | B1 * | 11/2022 | Dolby | G06F 8/436 |
| 2022/0107799 | A1 | 4/2022 | Wu | |
| 2022/0308848 | A1 * | 9/2022 | Clement | G06N 3/09 |
| 2022/0374595 | A1 * | 11/2022 | Gotmare | G06F 40/226 |
| 2023/0100208 | A1 | 3/2023 | Bahrami | |
| 2024/0020096 | A1 * | 1/2024 | Chen | G06F 40/30 |
| 2024/0020116 | A1 * | 1/2024 | Chen | G06N 3/08 |
| 2024/0354319 | A1 * | 10/2024 | Dinu | G06F 40/35 |
| 2024/0378399 | A1 * | 11/2024 | Gandhi | G06F 40/40 |
| 2025/0060944 | A1 * | 2/2025 | Radhakrishna | G06F 40/35 |
| 2025/0245253 | A1 * | 7/2025 | Mandal | G06F 16/3344 |

FOREIGN PATENT DOCUMENTS

| | | | |
|---|---|---|---|
| CN | 109634578 | B | 4/2021 |
| CN | 108519890 | B | 7/2021 |
| CN | 111090461 | B | 4/2023 |
| CN | 111625276 | B | 4/2023 |
| EP | 2400400 | A1 | 12/2011 |
| WO | 2012145782 | A1 | 11/2012 |
| WO | 2019223804 | A1 | 11/2019 |

OTHER PUBLICATIONS

Shin, Jiho, et al. "The good, the bad, and the missing: Neural code generation for machine learning tasks." ACM Transactions on Software Engineering and Methodology 33.2 (2023): 1-24.*

Chakraborty, Saikat, et al. "Natgen: generative pre-training by "naturalizing" source code." Proceedings of the 30th ACM joint european software engineering conference and symposium on the foundations of software engineering. 2022.*

Ji et al., "Benchmarking and Explaining Large Language Model-based Code Generation: A Causality-Centric Approach," arXiv:2310.06680v1 [cs.SE] Oct. 10, 2023, 19 pages.

Zhou et al., "CodeBERTScore: Evaluating Code Generation with Pretrained Models of Code," arXiv:2302.05527v2 [cs.SE] Oct. 31, 2023, 17 pages.

* cited by examiner

DERIVING HETEROGENOUS CONTEXT FOR EVALUATING GENERATED CODE

The present invention relates generally to the fields of generative artificial intelligence, software code evaluation, and machine learning and artificial intelligence for software code evaluation.

SUMMARY

According to one exemplary embodiment, a computer-implemented method is provided. A first code-generation prompt submitted to a first machine learning model is received. The first code-generation prompt requests generation of the first code in a first programming language. First code generated by the first machine learning model in response to the first machine learning model receiving the first code-generation prompt is received. The first code is compared to a first knowledge base built for the first programming language to find corresponding code and a first natural language explanation associated with the corresponding code. A second machine learning model performs semantic comparison of the first natural language explanation to the first code-generation prompt to generate a first semantic correctness score. The first semantic correctness score is presented.

According to another exemplary embodiment, a computer program product is provided that includes a set of one or more computer-readable storage media and program instructions, collectively stored in the set of one or more computer-readable storage media. The program instructions cause a processor set to perform computer operations. A first code-generation prompt submitted to a first machine learning model is received. The first code-generation prompt requests generation of the first code in a first programming language. First code generated by the first machine learning model in response to the first machine learning model receiving the first code-generation prompt is received. The first code is compared to a first knowledge base built for a second programming language to find corresponding code and a first natural language explanation associated with the corresponding code. The second programming language is different than the first programming language. A second machine learning model performs semantic comparison of the first natural language explanation to the first code-generation prompt to generate a first semantic correctness score. The first semantic correctness score is presented.

According to another exemplary embodiment, a computer system is provided that includes a processor set, a set of one or more computer-readable storage media, and program instructions, collectively stored in the set of the one or more computer-readable storage media. Execution of the program instructions by the processor set causes performance of computer operations. A first code-generation prompt submitted to a first machine learning model is received. The first code-generation prompt requests generation of the first code in a first programming language. First code generated by the first machine learning model is received in response to the first machine learning model receiving the first code-generation prompt. The first code is input into a second machine learning model so that the second machine learning model generates a first set of natural language explanations that describe the first code. The first set of natural language explanations is input into a third machine learning model so that the third machine learning model generates a first text summarization of the first set of natural language explanations. A fourth machine learning model performs semantic comparison of the first text summarization to the first code-generation prompt to generate a first semantic correctness score. The first semantic correctness score is presented.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a computer system, a method, and a computer program product for deriving heterogenous context for the explainability and trustworthiness of software code that is generated by a machine learning model, e.g., a generative model. Generative artificial intelligence has gained unprecedented attention and in some embodiments includes the use of large language models that are able to understand and produce natural languages and many computer programming languages. Due to some flaws with such models, evaluating the software code generated by these models is important. Such evaluation includes understanding the code and assessing the trustworthiness of the code.

Not all programming languages are equipped with extensive semantic checkers. For the generated code in a language without an extensive semantic checker, the semantic checker of another programming language is useable in the present techniques to check the generated code. The semantic correctness of automated intelligence generated code is validated using the counterpart language semantic checker.

The various techniques are implemented via a computer, e.g., via automated action of a model-generated code evaluation with heterogenous context program 916 when activated, e.g., via a human-computer interaction.

Figure 1:
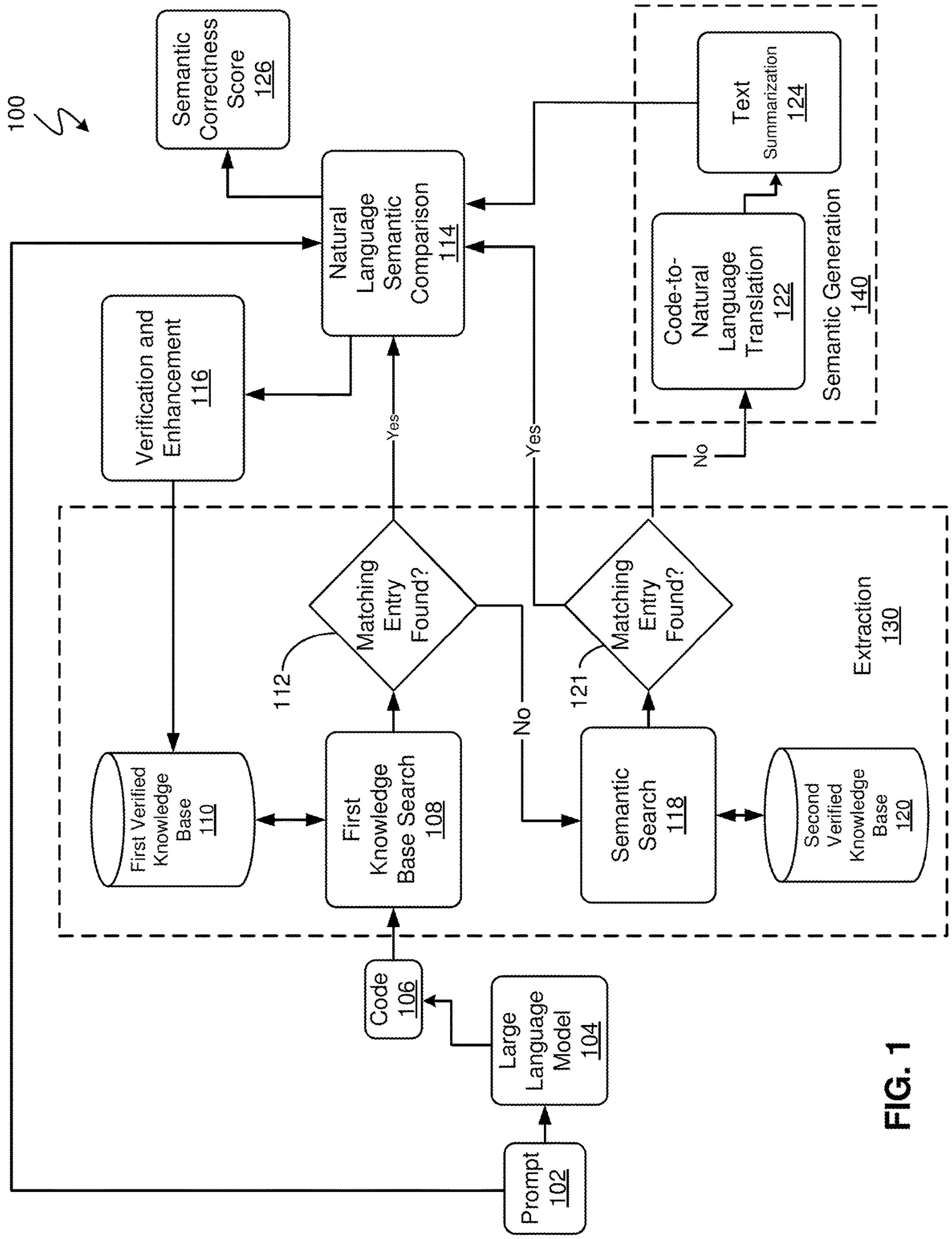
FIG. 1 illustrates a pipeline for model-generated code evaluation using heterogenous context according to at least one embodiment.
Figure 3:
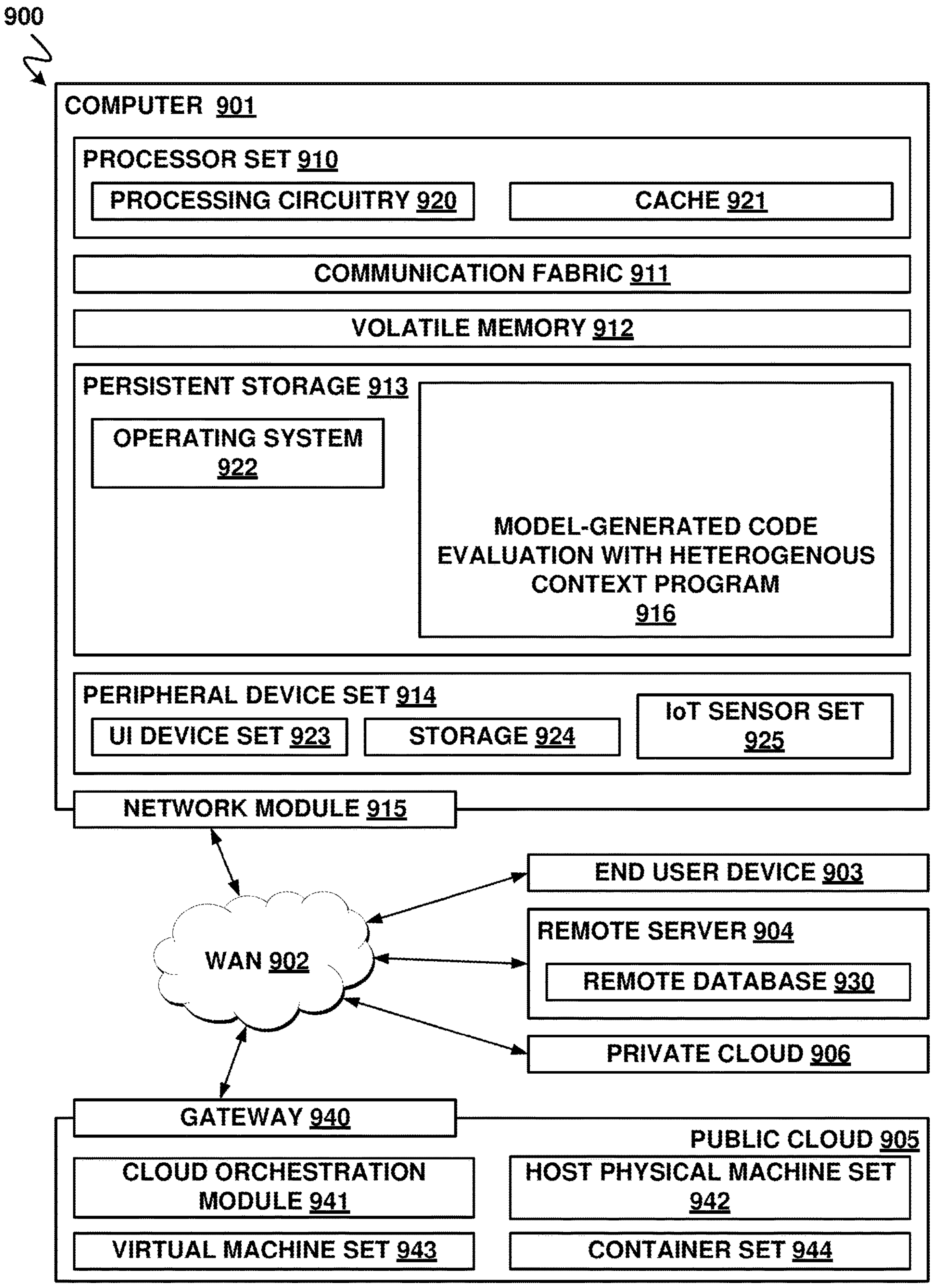
FIG. 3 illustrates a networked computer environment in which code evaluation with heterogenous context is performed according to at least one embodiment.

FIG. 1 illustrates a pipeline 100 for model-generated code evaluation using heterogenous context according to at least one embodiment. The program 916 shown in FIG. 3 controls the actions of the pipeline 100 in at least some embodiments.

FIG. 1 shows that in the pipeline 100 a prompt 102 is submitted to a large language model 104. The prompt includes natural language, e.g., text, and requests the large language model 104 to generate certain computer programming code. The "code" referred to herein refers to computer programming code. In at least some embodiments, the computer programming code includes high-level programming code that is able to be input and processed via a compiler. The prompt requests that the generated code be in a particular programming language, e.g., in a first programming language. Examples of the various programming languages mentioned herein include but are not limited to Java, Python, C++, Perl, Standard ML, C, Smalltalk, Prolog, Common Lisp, Scheme, ISLISP, Ada, Fortran, COBOL, SQL, and XQuery. The large language model 104 is an example of a first machine learning model and has received some previous machine learning training for generating computer programming code. In response to the inputting of the prompt 102, the large language model 104 produces first code which is shown as code 106 in FIG. 1. The large language model 104 is a generative machine learning model.

The prompt 102 provides some information and requests the large language model 104 to perform some task. For example, the prompt 102 says "Generate a Java code for summarizing three variables." For a generative machine learning model such as a large language model 104, the prompt is a question and/or task that a user submits to the generative machine learning model. A user is able to provide this prompt 102 via providing some input to a computer such as typing in a keyboard connected to the computer 901 and/or speaking instructions into a microphone connected to the computer 901 and the computer 901 performs speech-to-text transcription to produce text that constitutes the prompt 102. In response, the large language model 104 that is a generative machine learning model provides an answer or response. For example, the code generated in response to the above-mentioned specific example is "ret=a+b, ret+=c". The present embodiments provide tools and automation that help assess whether the code 106 generated here by the large language model 104 is trustworthy and/or functional.

Large language models (LLMs) are a category of foundation models (machine learning models) trained on immense amounts of data making them capable of understanding and generating natural language and other types of content to perform a wide range of tasks. LLMs are an implementation of artificial intelligence and, more particularly, generative artificial intelligence. LLMs have natural language understanding (NLU) and natural language processing (NLP) capabilities. Machine learning, machine learning models, algorithms, neural networks and transformer models provide architecture for LLMs. LLMs are a class of foundation models, which are trained on enormous amounts of data to provide the foundational capabilities needed to drive multiple use cases and applications, as well as resolve a multitude of tasks. LLMs are accessible through interfaces and provide information and/or perform tasks in response to receiving a prompt in natural language. LLMs are designed to understand and generate text like a human, in addition to other forms of content, based on the vast amount of data used to train them. Some features that LLMs have in some embodiments include the ability to infer from context, to generate coherent and contextually relevant responses, to translate text to different human languages, to summarize text, to answer questions (general conversation and FAQs), and to assist in creative writing and/or code generation tasks. The LLMs in some embodiments include billions of parameters that enable them to capture intricate patterns in language and perform a wide array of language-related tasks. LLMs are implementable in various fields, from chatbots and virtual assistants to content generation, research assistance and language translation.

LLMs operate by leveraging deep learning techniques and vast amounts of textual data. These models are in many embodiments based on a transformer architecture, like the generative pre-trained transformer, which handles sequential data like text input. LLMs in many embodiments include multiple layers of neural networks, each with parameters that can be fine-tuned during training, which are enhanced further by a numerous layer known as the attention mechanism, which dials in on specific parts of data sets. During the training process, these models learn to predict the next word in a sentence based on the context provided by the preceding words. The model does this through attributing a probability score to the recurrence of words that have been tokenized-broken down into smaller sequences of characters. These tokens are then transformed into embeddings, which are numeric representations of this context.

To ensure accuracy, this process involves training the LLM on a massive corpora of text (e.g., in the billions of pages), allowing the LLM to learn grammar, semantics and conceptual relationships through zero-shot and self-supervised learning. Once trained on this training data, LLMs can generate text by autonomously predicting the next word based on the input they receive, and drawing on the patterns and knowledge that the LLMs have acquired. The result is coherent and contextually relevant language generation that can be implemented for NLU and content generation tasks. Model performance can also be increased through prompt engineering, prompt-tuning, fine-tuning and other tactics like reinforcement learning with human feedback (RLHF).

A large language model 104 is trainable to be able to generate programming code from text by submitting training datasets to the large language model 104. A training dataset includes multiple sets of samples of (A) some code that is written in a particular programming language and (B) an associated natural language explanation that describes the code. By receiving and ingesting such training data, a generative language model develops an ability to generate code in response to receiving a natural language prompt. If the training data encompasses multiple programming languages, the trained model develops an ability to generate code in multiple languages. A prompt to that model can request code in a specific programming language known to the model. In various embodiments, the large language model 104 has received such training before the commencement of steps in the pipeline 100.

Because generative models are not perfectly trustworthy in the material which they generate or produce, methods to evaluate computer programming code generated by a model are advantageous. The present embodiments provide a way to evaluate the model-generated code for trustworthiness and explainability. The present embodiments apply various machine learning techniques to the code 106 and to the prompt 102 in order to produce this trustworthiness and/or explainability evaluation. The generative machine learning models are helpful but not perfectly reliable, so evaluation of the generated code is important. For example, computer programming code generated by the generative machine learning model sometimes includes one or more vulnerabilities such as an injection vulnerability or an SQL injection vulnerability. It is helpful to identify such a vulnerability before the generated code is implemented for application usage.

In at least some embodiments, the generated code 106 is submitted to a knowledge base associated with a particular programming language. The knowledge base includes sets of entries with paired natural language descriptions and actual code samples described by those natural language descriptions, respectively. For example, a Java programming language knowledge base includes an entry that the Code: a-b has a Meaning: subtraction.

FIG. 1 shows that the program 916 takes the code 106 generated by the generative model 104, in response to receiving the prompt, and submits the generated code 106 to one, some, or all of multiple knowledge bases associated with respective programming languages. FIG. 1 shows a first verified knowledge base 110 and a second verified knowledge base 120. The second verified knowledge base 120 provides code meaning for a programming language that is different from the programming language for which the first verified knowledge base 110 provides natural language explanations.

In a first example, the code 106 is submitted to a knowledge base which matches the programming language in which the code is written. In one example, the first verified knowledge base 110 is provided for the Java programming language. Therefore, the code 106 that is written in the Java language in one example is submitted to the first verified knowledge base 110 for a first knowledge base search 108 for evaluation purposes in this embodiment for the match of Java code to the Java knowledge base. The program 916 performs code comparison to compare the code 106 to the various code portions of the sets in the entries of the first verified knowledge base 110. This code comparison includes a comparison of code-string of the code 106 to various code-string entries stored in the first verified knowledge base 110. Various string searching algorithms are implemented here in various embodiments. For example, needle-haystack searching with one or more constraints provided, searching normalization, regular expression searching, naïve string searching, finite-state automation based searching, stub searching, and indexing are all various string searching techniques that are implemented for the first knowledge base search 108.

For any matching code that is identified in this automated search, the natural language description of the respective information set that is paired with the matching code is retrieved via the program 916. This retrieval occurs in an automated manner using computer components. This first knowledge base search 108 is shown in FIG. 1 and leads to a determination 112 of whether a matching entry is found. If a matching entry is found in the first verified knowledge base 110 via the search 108, then the pipeline proceeds to stage 114 in some embodiments. The retrieved natural language explanation as well as the original prompt 102 are forwarded to the stage 114 via the program 916. If, however, a matching entry is not found in the first verified knowledge base 110 via the search 108, then the pipeline proceeds to stage 118 in some embodiments.

In a second example which occurs directly after the code generation of the code 106, after the search 108 of the first verified knowledge base 110 is unsuccessful, or after the search 108 of the first verified knowledge base 110 is successful, the pipeline 100 includes submitting the code 106 in a search into a knowledge base which was generated for a programming language which does not match the programming language in which the code 106 is written. The not matching is also described as this second programming language being different from the first programming language in which the code 106 was generated. In one example building on the above-described example in which the first verified knowledge base 110 is for the Java programming language, the second verified knowledge base 120 is provided for the Python programming language. However, due to differences in coding structure between the different programming languages a normal code string search of comparing the code 106 to code entries within the second verified knowledge base 120 is not effective. Therefore, for the semantic search 118 embeddings for the code 106 and embeddings for the code entries within the second verified knowledge base 120 are generated and used for comparison and searching. The semantic search pipeline 200 shown in FIG. 2 describes more details of these aspects of the semantic search 118. The second verified knowledge base 120 also includes entries of written code paired with natural language meaning descriptors for particular written code.

Figure 2:
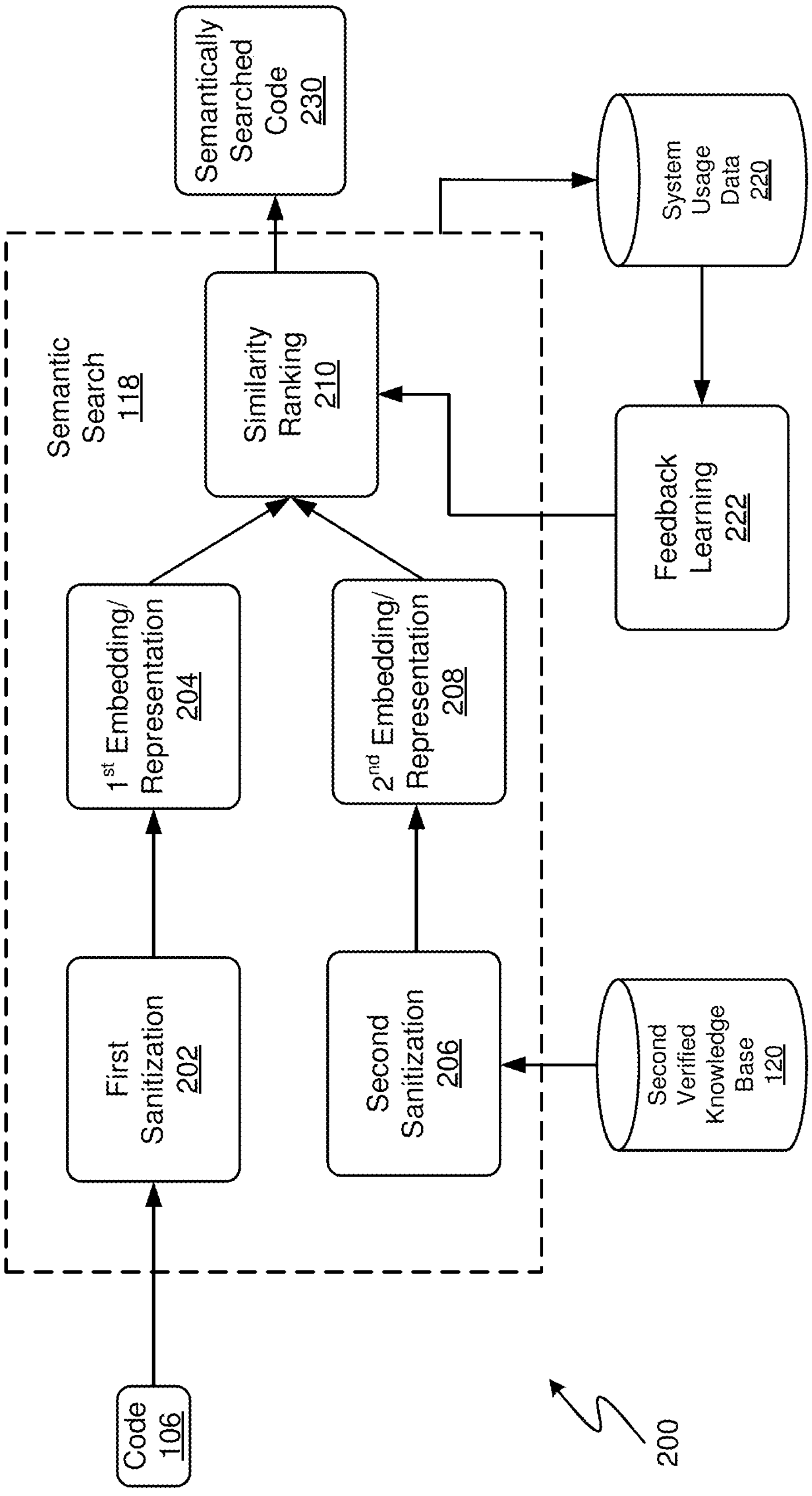
FIG. 2 illustrates details about semantic searching that are part of the pipeline shown in FIG. 1 according to at least one embodiment.

As shown in the semantic search pipeline 200 shown in FIG. 2, to prepare the code and code portions for embedding creation the semantic search 118 includes sanitizing of the code portions. This sanitizing occurs in an automated manner via execution of code or a software module equipped to perform the task. The code 106 that was generated from the large language model 104 (see FIG. 1) is sanitized in a first sanitization 202. In some embodiments, the first sanitization 202 includes removing comments that are adjacent to and/or mixed in with the code. In some embodiments, the first sanitization 202 includes removing language specific variables in the code. This first sanitization 202 is performed in an automated manner via the program 916. Similarly, code portions from the second verified knowledge base are sanitized in a second sanitization 206. In some embodiments, the second sanitization 206 includes removing comments that are adjacent to and/or mixed in with the code portions that were stored in the second verified knowledge base 120. In some embodiments, the second sanitization 206 includes removing language specific variables in the code. This second sanitization 206 is performed in an automated manner via the program 916. For comprehensive searching, in some embodiments each piece of annotated code portion in the second verified knowledge base 120 is sanitized piece-by-piece in the second sanitization 206 before proceeding to the second embedding/representation 206. For some embodiments of searching, the various pieces of the of annotated code portion in the second verified knowledge base 120 are sanitized piece-by-piece in the second sanitization 206 depending on comparison results that occur in a subsequent step 210. This sanitizing-based-on-comparison-results embodiment occurs with more code sections being sanitized for comparison preparation if no matches are found from earlier embeddings.

After the two sanitization steps 202, 206, the semantic search pipeline 200 proceeds to two embedding/representation generation steps in 204, 208, respectively. The step 204 can proceed without waiting for completion of second sanitization 206. The step 208 can proceed without waiting for completion of first sanitization 202. The sanitized code from first sanitization 202 proceeds to the first embedding/representation 204. Stage 204 produces an embedding or a representation that represents the code 106 that was produced via the large language model 104. The sanitized code from second sanitization 206 proceeds to the second embedding/representation 208. Stage 208 produces multiple respective embeddings or representations that represent the code portions that were being stored in the second verified knowledge base 120.

The stages 204, 208 to produce the embeddings are produced in at least some embodiments via another machine learning model which includes an embedding layer. In at least some embodiments this other machine learning model is different from the large language model 104. The stages 204, 208 input the various code sanitized from stages 202, 206 into the same machine learning model and layers thereof to produce the various embeddings. The same model and layers are used so that the various code portions are input into the same embedding space for facilitating comparison of the embeddings. For example, a FAISS model or a ColBERT model are examples of machine learning models that can be used for stages 204, 208 to produce the embedding/representation.

In at least some embodiments, all of the code stored in the second verified knowledge base 120 is input into the embedding layer to produce a number of embeddings for the various stored codes of the second verified knowledge base (KB) 120.

After the stages 204, 208, in the stage 210 for similarity ranking a comparison between the embedding(s) for the first generated code 106 and the various embeddings from the code portions stored in the second verified knowledge base 120 is performed to find the specific embedding from the latter group that is most similar to the embedding from the first generate code 106. For each respective embedding comparison, a similarity score is determined and the embedding (from codes from the 2$^{nd}$ KB 120) that is most similar to the embedding representing code 106 is identified. Various embedding comparison techniques are implementable here. Examples include but are not limited to a cosine similarity determination, a Euclidean distance determination, and a dot product determination.

In at least some embodiments, the comparisons produce a difference value which is compared to a pre-determined threshold value. When none of the embeddings from the code for the second verified knowledge base 120 achieves a difference value (compared to the embedding for the code 106) that is smaller than the pre-determined threshold value, then the conclusion is that the code 106 has no match in the second verified knowledge base 120. In some embodiments, a best match of the various comparisons is the embedding from the set of embeddings from the second verified knowledge base 120 which is closest to the embedding from the code 106, e.g. so that the difference value is the smallest. In some embodiments, the best match is only forwarded if the difference value of the best match compared to the embedding from code 106 is smaller than the pre-determined threshold value. In some embodiments, the best match information is forwarded without having a requirement to exceed or stay below a pre-determined threshold value. In some embodiments, a difference value of 0.2 or less indicates matching code.

When a match is determined, a semantically searched code 230 is forwarded along with its paired natural language explanation that was retrieved from the second verified knowledge base 120. The paired natural language explanation is used in stage 114 as is explained below.

A human subject matter expert also is able to provide feedback in the semantic search 118 to help improve the ranking scheme. System usage data 220 from the semantic search 118 is accessed for feedback learning 222. Via this feedback learning 222, the ranking program for similarity ranking 210 for the comparisons is improved. In some embodiments, a subject matter expert analyzes the system usage data 220 to generate the feedback learning 222 and to provide enhancements for the similarity ranking 210. The program 916 automatically collects historical system data including the input code 106 and the computed semantically searched code 230 which together are part of the system usage data 220. In some embodiments, the similarity ranking 210 is top-k based so the program 916 also collects all of the top-k results as part of the system usage data 220. For the feedback learning 222, a human subject matter expert manually validates various results indicated in the collected system usage data 220. For example, the subject matter expert checks whether the semantically searched code 230 is the best in the top-k candidates. For checks which indicate system inaccuracy, for the feedback learning 222 the subject matter expert indicates a correction for the system. This indication is input into a computer via one or more input devices. Thus, the next time similarity ranking 210 is performed in another iteration for the same or different input code 106 then the subject matter expert knowledge added to supplement the semantic search 118 is invoked in this future performance.

In a third example (shown in pipeline 100 in FIG. 1) which occurs directly after the code generation of the code 106, after the search 108 of the first verified knowledge base 110 occurs successfully or unsuccessfully, or after the semantic search 118 of the second verified knowledge base 120 is successful or unsuccessful, the pipeline 100 includes submitting the code 106 for a semantic generation stage 140. The extraction stage 130 includes as its own last stage a determination stage 121 at which a determination is made as to whether the semantic search 118 found a matching entry for the code portions in the second verified knowledge base 120. If a matching entry is found in the second verified knowledge base 120 via the semantic search 118, then the pipeline proceeds to stage 114 in some embodiments. The retrieved natural language explanation (from second verified KB 120) as well as the original prompt 102 are forwarded to the stage 114 for the program 916. If, however, a matching entry is not found in the second verified knowledge base 120 via the semantic search 118, then the pipeline proceeds to semantic generation stage 140 in some embodiments and, particularly, to the code-to-natural language translation 122 which is the first portion of the semantic generation 140.

For the code-to-natural language translation 122, the code 106 is submitted to a machine learning model that is configured to generate a natural language description of code in response to receiving the code as input. In some embodiments, this translation 122 is performed via a generative machine learning model. The generative machine learning model used for this translation 122 is in some embodiments a different generative machine learning model than the large language model 104. In some embodiments, the generative machine learning model used for this translation 122 is the large language model 104. This translation 122 includes a line-by-line translation of the generated code 106 into a natural language description for each line of the generated code 106.

The machine learning model used for translation stage 122 is a machine learning model trained like the large language model 104 to learn from computer programming code training data including pairs of (A) code portions and (B) natural language explanations for the code portions, respectively.

In at least some embodiments, the natural language description produced in stage 122 is then input into a text summarization stage 124 and particularly into a machine learning model trained to produce a natural language summary of a larger group or body of natural language text. The generative machine learning model used for this text summarization 124 is in some embodiments a different generative machine learning model than the large language model 104 and/or different from the generative machine learning model used for translation stage 122. In some embodiments, the generative machine learning model used for the translation 122 is the large language model 104 and/or the same generative machine learning model used for the translation 122.

The machine learning model used for text summarization stage 124 is trained to analyze text data like a language machine learning model but is not required to have received any training for computer programming code generation or analysis tasks.

Whether from the first search 108, the semantic search 118, and/or from the semantic generation 140, a natural language explanation is submitted to the natural language semantic comparison stage 114. A machine learning model performs the natural language semantic comparison 114 to compare the prompt 102 and the natural language explanation(s) received from one or more of the first search 108, the semantic search 118, and the semantic generation 140, respectively. This machine learning model implements natural language processing techniques to determine a semantic correctness score. A high similarity between the prompt 102 and the natural language explanation indicates that the automated check of the generated code 106 produces a similar text summary of the nature of the code as was requested in the text of the original prompt 102 that was submitted to the large language model 104 to generate the code 106. The original prompt and the natural language meaning produced in one of the three different alternatives mentioned above are submitted to the natural language semantic comparison module 114 to see if the two sets of words semantically match. The natural language semantic comparison module provides a semantic correctness score 126. One or more of various semantic comparison techniques are implemented here via the program 916 to perform the comparison 114. Examples include but are not limited to embedding creation of the two texts to compare, followed by a similarity determination of the two embeddings. Examples of such an embedding similarity determination include but are not limited to a cosine similarity determination, a Euclidean distance determination, and a dot product determination.

The semantic correctness score 126 is presented, e.g., via an output component of the computer 901. In various embodiments, the computer 901 includes a UI device set 923 with output components such as a display screen, speaker, microphone, wearable devices (such as goggles and smart watches), keyboard, mouse, printer, touchpad, game controllers, and haptic devices. The semantic correctness score 126 is presented via one or more of these output components in some embodiments.

In some embodiments, the output of the natural language semantic comparison 114 is also passed to a human evaluator (subject matter expert) who then performs an additional verification and enhancement 116 of the generated code 106 and its one or more natural language descriptions. This verification and enhancement 116 includes confirming whether the code 106 is trustworthy and functional and whether the natural language description(s) accurately describe the generated code 106. The human evaluator provides via computer interaction an indication of the meaning of the generated code which confirms the meaning found in the verified knowledge base and/or adds any additional meaning. This verification and enhancement 116 is passed back to the first verified knowledge base 110 to update same. The human evaluator in some embodiments runs the generated code 106 through a security checker before providing a verification. The first verified knowledge base 110 becomes stronger and more robust through these updates from the subject matter experts.

These techniques are applicable to programming languages and verified knowledge bases for a variety of computer programming languages. Augmenting the generated code with contextual information from different sources helps achieve improved explainability and trustworthiness. The code semantics are checked in the natural language dimension. Semantic extraction and semantic generation are combined for previously studied and for unseen code. The techniques learn and improve from system and usage and by having a human-in-the-loop. Input on the validity of the semantic extractions and semantically matched search results are gathered. Feedback on the semantic extractions is used to improve the extraction process. Feedback on semantically matched results are used to improve the similarity ranking.

The present embodiments make it feasible to assess trustworthiness and provide explainability for results powered by artificial intelligence technology. The generative machine learning model then produces results that are more trustworthy. Hallucination of the generative artificial intelligence (e.g., of large language model 104) is better recognized and remedied. These techniques facilitate the adoption of generative artificial intelligence in information technology automations of current society. The present embodiments perform semantic comparison between code and code.

It may be appreciated that FIGS. 1 and 2 provide only illustrations of certain embodiments and do not imply any limitations with regard to how different embodiments may be implemented. Many modifications to the depicted embodiment(s), e.g., to particular steps, elements, and/or order of depicted methods or components of the pipeline, may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as model-generated code evaluation with heterogenous context program 916. In addition to model-generated code evaluation with heterogenous context program 916, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and model-generated code evaluation with heterogenous context program 916, as identified above), peripheral device set 914 (including user interface (UI) device set 923, storage 924, and Internet of Things (IOT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in model-generated code evaluation with heterogenous context program 916 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in model-generated code evaluation with heterogenous context program 916 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing exceptionally large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The computer 901 in some embodiments also hosts one or more machine learning models such as the generative machine learning model or the other machine learning models described above. One or more of these machine learning models in one embodiment is stored in the persistent storage 913 of the computer 901. A received data sample is input to the machine learning model via an intra-computer transmission within the computer 901, e.g., via the communication fabric 911, to a different memory region hosting the machine learning model(s).

In some embodiments, one or more machine learning models are stored in computer memory of a computer positioned remotely from the computer 901, e.g., in a remote server 904 or in an end user device 903. In this embodiment, the program 916 works remotely with this machine learning model to access same. Prompts are sent via a transmission that starts from the computer 901, passes through the WAN 902, and ends at the destination computer that hosts the machine learning model. Thus, in some embodiments the program 916 at the computer 901 or another instance of the software at a central remote server performs routing of machine learning input to multiple server/geographical locations in a distributed system.

In such embodiments, a remote machine learning model is configured to send its output back to the computer 901 so that the code evaluation output from using the trained model to analyze newly generated code is provided and presented to a user. The machine learning model receives a copy of the new code, performs machine learning analysis on the received sample, and transmits the results, e.g., an output back to the computer 901.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A computer-implemented method comprising:

receiving a first code-generation prompt submitted to a first machine learning model, the first code-generation prompt requesting generation of first code in a first programming language;

receiving first code generated by the first machine learning model in response to the first machine learning model receiving the first code-generation prompt;

comparing the first code to a first knowledge base built for the first programming language, wherein the first knowledge base comprises sets of paired:

code samples written in the first programming language, and natural language descriptions that respectively describe the code samples, wherein the comparing finds:

corresponding code of the code samples, and a first natural language explanation of the natural language descriptions associated with the corresponding code, and wherein the comparing comprises comparing code-string of the first code to respective code-strings of the code samples to find a best match of the code samples, the best match forming the corresponding code;

performing, via a second machine learning model, semantic comparison of the first natural language explanation to the first code-generation prompt to generate a first semantic correctness score;

presenting the first semantic correctness score; and implementing the first code for application usage.

2. The computer-implemented method of claim 1, further comprising:

receiving a second code-generation prompt submitted to the first machine learning model the second code-generation prompt requesting generation of second code in the first programming language;

receiving the second code generated by the first machine learning model in response to the first machine learning model receiving the second code-generation prompt;

comparing the second code to the first knowledge base; and in response to the comparison of the second code to the first knowledge base not finding code in the first knowledge base that corresponds to the second code, comparing the second code to a second knowledge base built for a second programming language to find corresponding code and a natural language explanation associated with the corresponding code, the second programming language being different from the first programming language.

3. The computer-implemented method of claim 2, wherein the comparison of the second code to the second knowledge base comprises:

generating a first embedding from the second code;

generating additional embeddings from code from the second knowledge base;

comparing the first embedding to the additional embeddings, respectively, to produce similarity rankings to find a best match; and forwarding the natural language explanation that corresponds to the corresponding code that corresponds to the best match of the additional embeddings.

4. The computer-implemented method of claim 3, wherein a similarity score for the best match is above a pre-determined threshold value.

5. The computer-implemented method of claim 3, further comprising:

performing, via the second machine learning model, semantic comparison of the forwarded natural language explanation to the second code-generation prompt to generate a second semantic correctness score; and presenting the second semantic correctness score.

6. The computer-implemented method of claim 1, further comprising:

receiving a third code-generation prompt submitted to the first machine learning model, the third code-generation prompt requesting generation of the first code in the first programming language;

receiving third code generated by the first machine learning model in response to the first machine learning model receiving the third code-generation prompt;

inputting the third code into a third machine learning model so that the third machine learning model generates a first set of natural language explanations that describe the third code;

inputting the first set of natural language explanations into a fourth machine learning model so that the third machine learning model generates a first text summarization of the first set of natural language explanations;

performing, via the second machine learning model, semantic comparison of the first text summarization to the third code-generation prompt to generate a third semantic correctness score; and presenting the third semantic correctness score.

7. The computer-implemented method of claim 1, further comprising presenting the generated first code to a subject matter expert for at least one of verification and enhancement, wherein the presenting is performed in response to the first semantic correctness score passing a test with a pre-determined threshold value.

8. The computer-implemented method of claim 7, further comprising updating the first knowledge base based on the at least one of the verification and the enhancement.

9. A computer program product comprising:

a set of one or more computer-readable storage media; and program instructions, collectively stored in the set of one or more computer-readable storage media, the program instructions causing a processor set to perform computer operations comprising:

receiving a first code-generation prompt submitted to a first machine learning model, the first code-generation prompt requesting generation of first code in a first programming language;

receiving first code generated by the first machine learning model in response to first machine learning model receiving the first code-generation prompt;

comparing the first code to a first knowledge base built for a second programming language, wherein the first knowledge base comprises sets of paired:

code samples written in the second programming language, and natural language descriptions that respectively describe the code samples, wherein the comparing finds:

corresponding code of the code samples, and a first natural language explanation of the natural language descriptions associated with the corresponding code, wherein the comparing comprises comparing a first embedding generated from the first code and additional embeddings generated from the code samples, and wherein the second programming language is different than the first programming language;

performing, via a second machine learning model, semantic comparison of the first natural language explanation to the first code-generation prompt to generate a first semantic correctness score;

presenting the first semantic correctness score; and implementing the first code for application usage.

10. The computer program product of claim 9, wherein the comparing the first embedding to the additional embeddings, respectively, produces similarity rankings to find a best match; and wherein the first natural language explanation corresponds to the corresponding code that is a best match based on the comparing of the first embedding to the additional embeddings.

11. The computer program product of claim 10, wherein a similarity score for the best match is above a pre-determined threshold value.

12. The computer program product of claim 9, wherein the computer operations further comprise comparing the first code to a second knowledge base built for the first programming language to find corresponding code and a first natural language explanation associated with the corresponding code;

wherein the comparing of the first code to the first knowledge base built for the second programming language occurs in response to the comparing of the first code to the second knowledge base not finding any code that corresponds to the first code.

13. The computer program product of claim 9, wherein the computer operations further comprise:

receiving a second code-generation prompt submitted to the first machine learning model, the second code-generation prompt requesting generation of the first code in the first programming language;

receiving second code generated by the first machine learning model in response to the first machine learning model receiving the second code-generation prompt;

inputting the second code into a third machine learning model so that the third machine learning model generates a first set of natural language explanations that describe the third code;

inputting the first set of natural language explanations into a fourth machine learning model so that the fourth machine learning model generates a first text summarization of the first set of natural language explanations;

performing, via the second machine learning model, semantic comparison of the first text summarization to the second code-generation prompt to generate a second semantic correctness score; and presenting the second semantic correctness score.

14. The computer program product of claim 9, wherein the computer operations further comprise presenting the generated first code to a subject matter expert for at least one of verification and enhancement, wherein the presenting to the subject matter expert occurs in response to the first semantic correctness score passing a test with a pre-determined threshold value.

15. The computer program product of claim 14, wherein the computer operations further comprise updating the first knowledge base based on the at least one of the verification and the enhancement.

16. A computer system comprising:
- a processor set;
- a set of one or more computer-readable storage media; and
- program instructions, collectively stored in the set of the one or more computer-readable storage media, wherein execution of the program instructions by the processor set causes performance of computer operations comprising:
  - receiving a first code-generation prompt submitted to a first machine learning model, the first code-generation prompt requesting generation of first code in a first programming language;
  - receiving first code generated by the first machine learning model in response to the first machine learning model receiving the first code-generation prompt;
  - inputting the first code into a second machine learning model so that the second machine learning model generates a first set of natural language explanations that describe the first code;
  - inputting the first set of natural language explanations into a third machine learning model so that the third machine learning model generates a first text summarization of the first set of natural language explanations;
  - performing, via a fourth machine learning model, semantic comparison of the first text summarization to the first code-generation prompt to generate a first semantic correctness score;
  - presenting the first semantic correctness score; and
  - implementing the first code for application usage.

17. The computer system of claim 16, wherein the computer operations further comprise comparing the first code to a first knowledge base built for the first programming language to find corresponding code and a first natural language explanation associated with the corresponding code;
- wherein the inputting of the first code into the second machine learning model occurs in response to the comparing of the first code to the first knowledge base not finding any code that corresponds to the first code.

18. The computer system of claim 16, wherein the computer operations further comprise
- comparing the first code to a first knowledge base built for a second programming language to find corresponding code and a first natural language explanation associated with the corresponding code, the second programming language being different than the first programming language;
  - wherein the inputting of the first code into the second machine learning model occurs in response to the comparing of the first code to the first knowledge base not finding any code that corresponds to the first code.

19. The computer system of claim 16, wherein the computer operations further comprise presenting the generated first code to a subject matter expert for at least one of verification and enhancement, wherein the presenting is performed in response to the first semantic correctness score passing a test with a pre-determined threshold value.

20. The computer system of claim 19, wherein the computer operations further comprise updating a first knowledge base based on the at least one of the verification and the enhancement.

* * * * *